US012688555B2

(12) United States Patent
Bronder

(10) Patent No.: US 12,688,555 B2
(45) Date of Patent: Jul. 21, 2026

(54) TILE STITCHING HIGH-RESOLUTION IMAGES WITH HALOS AND SEAM MITIGATION

(71) Applicant: Microsoft Technology Licensing, LLC, Redmond, WA (US)

(72) Inventor: Matthew Lawrence Bronder, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 18/679,056

(22) Filed: May 30, 2024

(65) Prior Publication Data

US 2025/0371661 A1 Dec. 4, 2025

(51) Int. Cl.
| | |
|---|---|
| *G06T 3/4053* | (2024.01) |
| *G06T 5/60* | (2024.01) |
| *G06T 7/11* | (2017.01) |
| *G06T 7/136* | (2017.01) |

(52) U.S. Cl.
CPC .............. *G06T 3/4053* (2013.01); *G06T 5/60* (2024.01); *G06T 7/11* (2017.01); *G06T 7/136* (2017.01); *G06T 2207/20021* (2013.01); *G06T 2207/20081* (2013.01); *G06T 2207/20212* (2013.01); *G06T 2207/30168* (2013.01)

(58) Field of Classification Search
CPC . G06T 3/4053; G06T 5/60; G06T 7/11; G06T 7/136; G06T 2207/20021; G06T 2207/20081; G06T 2207/20212; G06T 2207/30168
See application file for complete search history.

(56) References Cited

U.S. PATENT DOCUMENTS

| | | | |
|---|---|---|---|
| 2019/0272622 | A1 | 9/2019 | Voroshilov |
| 2020/0051211 | A1 | 2/2020 | Shiokawa |
| 2023/0334622 | A1 | 10/2023 | Bongsoo |
| 2024/0073449 | A1 * | 2/2024 | Novikov .................. G06T 5/70 |

FOREIGN PATENT DOCUMENTS

| | | | | |
|---|---|---|---|---|
| JP | 2005164347 A | * | 6/2005 | |
| KR | 20230018968 A | * | 2/2023 | ............... G06T 1/60 |

OTHER PUBLICATIONS

Lee, Juhyoung, Jinsu Lee, and Hoi-Jun Yoo. "SRNPU: An energy-efficient CNN-based super-resolution processor with tile-based selective super-resolution in mobile devices." IEEE Journal on Emerging and Selected Topics in Circuits and Systems 10, No. 3 ( 2020): 320-334. (Year: 2020).*

International Search Report and Written Opinion received for PCT Application No. PCT/US2025/019068, May 13, 2025, 11 pages.

* cited by examiner

*Primary Examiner* — Carol W Chan
(74) *Attorney, Agent, or Firm* — Workman Nydegger

(57) ABSTRACT

Systems are provided for dynamically splitting input images into a plurality of input tiles for processing by a super-resolution model. The size and halo region of the input tiles is based on a degradation associated with the convolutional operations of the super-resolution model. The input tiles are processed by the super-resolution model to generate output tiles that are stitched together into output images that are of a higher or different resolution than the input images.

18 Claims, 7 Drawing Sheets

700

Obtaining input images for super-resolution processing
710

Obtaining a super-resolution model trained to transform the input images from a first resolution into corresponding output images of a second resolution that is higher than the first resolution
720

Splitting the input images into a plurality of input tiles of the first resolution having a tile size and a halo region that defines an overlap of adjacent input tiles, the tile size and the halo region being selected based on a degradation threshold associated with the super-resolution model when the super-resolution model performs convolution operations on pixels within the halo region
730

Applying the super-resolution model to the plurality of input tiles of the first resolution to generate corresponding output tiles of the second resolution
740

Stitching the output tiles into output images
750

Tiled Image

Image

Image Tiles

420

450

410

440

Tiled Image

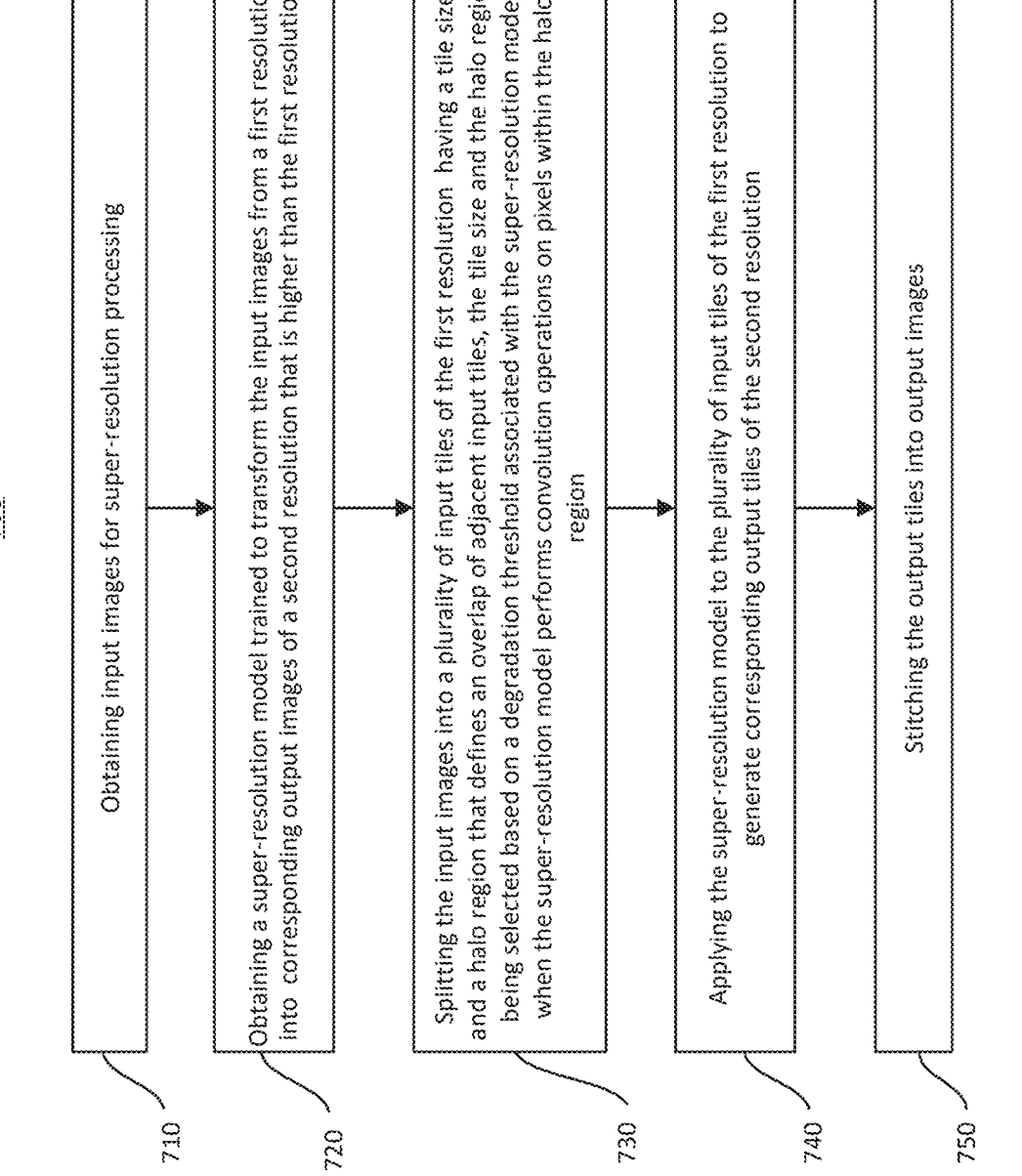

700

710  Obtaining input images for super-resolution processing

720  Obtaining a super-resolution model trained to transform the input images from a first resolution into corresponding output images of a second resolution that is higher than the first resolution 730  Splitting the input images into a plurality of input tiles of the first resolution having a tile size and a halo region that defines an overlap of adjacent input tiles, the tile size and the halo region being selected based on a degradation threshold associated with the super-resolution model when the super-resolution model performs convolution operations on pixels within the halo region 740  Applying the super-resolution model to the plurality of input tiles of the first resolution to generate corresponding output tiles of the second resolution 750  Stitching the output tiles into output images

Fig. 7

TILE STITCHING HIGH-RESOLUTION IMAGES WITH HALOS AND SEAM MITIGATION

BACKGROUND

With conventional image processing, it is possible to render images at a variety of display resolutions. This is particularly beneficial for enabling content that is saved at one resolution to be rendered at different resolutions on a plurality of different display devices having different display capabilities. For example, images that are saved at low resolutions can be upscaled to higher resolutions for display on high-resolution displays.

The upscaling of images is sometimes referred to as super-resolution processing. With super-resolution processing, a higher resolution image of a base image is generated by rendering the base image with a higher pixel density than the underlying base image. For example, a base image having a 2K resolution (1920×1080 pixel resolution) can be upscaled to a 4K resolution image (3840×2160 pixel resolution) by converting each of the pixels in the base image into four new upscaled pixels.

Super-resolution processes utilize specialized algorithms that are configured to generate outputs comprising new details for the newly upscaled pixels, which are not present in the underlying pixels, and such that the new upscaled pixels are not mere duplicates of the underlying base pixels from which they depend. By way of example, each of the new pixels in an upscaled image will usually contain a unique set of properties that are derived from some combination of the underlying base pixels' properties, as well as the properties of the neighboring pixels that are contained within the base image and, in some instances, the new pixel properties will also be based at least in part on the properties of other new neighboring pixels of the upscaled image.

Many different types of super-resolution algorithms and techniques can be used to upscale and enhance an image. For instance, some super-resolution processes can be used to smooth out the edges of the new pixels that are being generated. Some super-resolution processes can also be used to cause the final upscaled images to appear more detailed than the underlying images from which they are based. The super-resolution model algorithms can be tuned for different desired outcomes and styles by controlling algorithm weights applied to control variables or parameters of the algorithms that are based on attributes of the images being processed.

Recent developments in computer technologies include the creation of machine learning models that can be trained to perform various tasks, including upscaling and other forms of super-resolution image processing. Super-resolution machine learning models, for example, can be configured with one or more of the super-resolution processing algorithms that are trained to perform super-resolution processing on a particular type or class of lower-resolution images by applying the models to training data that comprises pairs of low-resolution and high-resolution images and in such a manner as to consistently generate images of a high-resolution based on inputs comprising low-resolution images, similar to the training data.

However, super-resolution models face several challenges, such as limited computing resources and memory constraints that can prevent the models from processing the entirety of each image all at once. To address these problems, some super-resolution processing systems are configured to subdivide the input images into a plurality of smaller tiles that are more manageably processed by the super-resolution models. Then, these tiles are processed by the super-resolution model to perform upscaling and other super-resolution processing on the tiles. After the tiles are upscaled, they can be stitched back together into a final high-resolution output image. In principle, the tiling of the initial image is a practical solution for addressing resource constraints experienced during super-resolution processing.

Unfortunately, the tiling of an image can also introduce undesirable boundary artifacts that are manifest once the tiles are stitched back together within the final output images. These boundary artifacts, which can also be referred to as seams, are visible discontinuities and inconsistencies formed between adjacent tiles as a result of the convolutional operations that the models use during super-resolution processing.

The convolutional operations performed on the images include generating pixel outputs based on the properties of the underlying input pixels, as well as the attributes of the neighboring pixels adjacent to and, sometimes, within a predetermined proximity to the underlying input pixel being processed. Notably, however, when an image is broken into tiles then artificial edges are introduced into the input images, where an underlying pixel along a tile edge will not be able to use the data from the previously neighboring pixels to utilize during the convolutional operations in at least one direction relative to those edge pixels because the system purges the adjacent pixel data from memory during these operations to conserve memory, as previously discussed.

In these scenarios, the system must compensate for the artificial edges by using a padding strategy to compensate for the pixel values of missing neighbor pixels. The result of this padding is that the output pixels along the tile edges will be generated with artificial data that can create discontinuities and overall reduced output quality relative to the output pixels generated for the other pixels in the tile that have a full field of neighboring pixels. For example, the edge pixels in the far-right columns of one tile may not match up with the edge pixels in the far-left columns of the tile to its right. This happens because the rendering of each tile includes speculating what features extend beyond what the model can actually see within the tile being rendered.

In view of the foregoing, it will be appreciated that there is an ongoing need and desire for new and improved techniques for performing super-resolution processing and particularly for techniques that can be utilized to address the problems associated with the seams that are formed as a result of tiling images during super-resolution processing.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include methods and corresponding systems for dynamically controlling the tiling of images for processing by super-resolution models and for performing super-resolution processing of the images.

Some aspects include dynamically splitting input images into a plurality of input tiles for processing by a super-resolution model. The size of the input tiles and corresponding halo region of the input tiles is dynamically based on an actual degradation and/or degradation threshold associated with the convolutional operations of the super-resolution model. The input tiles are processed by the super-resolution model to generate output tiles that are stitched together into output images that are of a higher or different resolution than the input images.

With regard to the foregoing, it will be appreciated that the term halo, as used herein, refers to the tensor input region of an image tile that extends beyond the tensor output region of the image tile used during the convolutional processing. The pixels in that halo region are discarded after the image processing but are used during the image processing to provide the retained interior tile output to be based on a more thoroughly populated receptive field.

Some embodiments include methods and corresponding systems that implement the methods, wherein the methods include acts of: identifying input images for super-resolution processing; identifying a super-resolution model trained to transform the input images from a first resolution into corresponding output images of a second resolution that is higher than the first resolution; splitting the input images into a plurality of input tiles having a tile size and a halo region that defines an overlap of adjacent input tiles, the tile size and the halo region being selected based on a degradation and/or degradation threshold associated with convolution operations of the super-resolution model; applying the super-resolution model to the plurality of input tiles of the first resolution to generate the corresponding output tiles of the second resolution; and stitching the output tiles into output images.

In some aspects, user input is provided for identifying the degradation and threshold degradation associated with the super-resolution model performing convolution operations on pixels within the input tiles of the input images.

In some aspects, the systems automatically select and or modify the tile size and halo region in response to identifying a degradation associated with the super-resolution model while performing convolution operations, such as based on a loss function (e.g., a loss when generating output pixels for a full image with no tiling relative to a loss when generating output pixels for a tiled image with a given tile size and discarded halo region). As noted above, the pixels in the halo region are discarded after the image processing but are used during the image processing to provide a retained interior tile output based on a more thoroughly populated receptive field.

In some aspects, the same super-resolution model is applied to differently sized tiles, wherein first images are split into a first plurality of input tiles of a first size with a first halo region, and second images are split into a second plurality of input tiles of a different size having a different halo region, such that the super-resolution model is flexibly applied to the first and second plurality of tiles having different sizes and different halo regions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates the tiled image of FIG. 3 and the separation of the image tiles.

FIG. 7 illustrates an example of a flow diagram of acts associated with methods for performing the functionality described in the application, including the tiling of images into input tiles having a size and halo region based on degradation caused by convolutional operations of a super-resolution model that processes the input tiles to generate output tiles that are stitched together into output images.

DETAILED DESCRIPTION

As noted above, the disclosed embodiments include methods and systems for controlling the manner in which images are processed by a super-resolution model by splitting the images into a plurality of input tiles for processing by the super-resolution model. As also described herein, the size of the input tiles and halo regions of the input tiles is based on a degradation threshold and/or degradation associated with the convolutional operations of the super-resolution model.

The disclosed embodiments can be utilized to facilitate super-resolution processing in a manner that can help overcome many of the foregoing problems associated with super-resolution processing. In particular, by providing embodiments for dynamically adjusting the size and halo region of the tiles that are split from the images being processed, it is possible to help control the scale of visible seaming that can occur as a result of the convolutional operations performed on discrete tiles of the images performed during super-resolution processing.

The disclosed embodiments also include beneficially enabling the use of a single super-resolution model for performing super-resolution processing in different use scenarios in which tiles of different sizes and halo regions are processed by the same super-resolution model. This is particularly beneficial for enabling users to flexibly select the desired balance between performance degradation with varying degrees of visibility for the image seams and the varying amounts of memory and processing resources that are consumed while reducing performance degradation. It will be appreciated that this is an improvement over conventional systems that leverage tiling processes for super-resolution processing and that hard-code the super-resolution processing to split the image tiles into tiles of only a single tile size and/or that apply only a single size of a halo region to capture pixel data for pixels that are at the edges of the tiles being processed, such that the degradation and seams that result in the output images from the convolutional operations are not adjustable.

Figure 1:
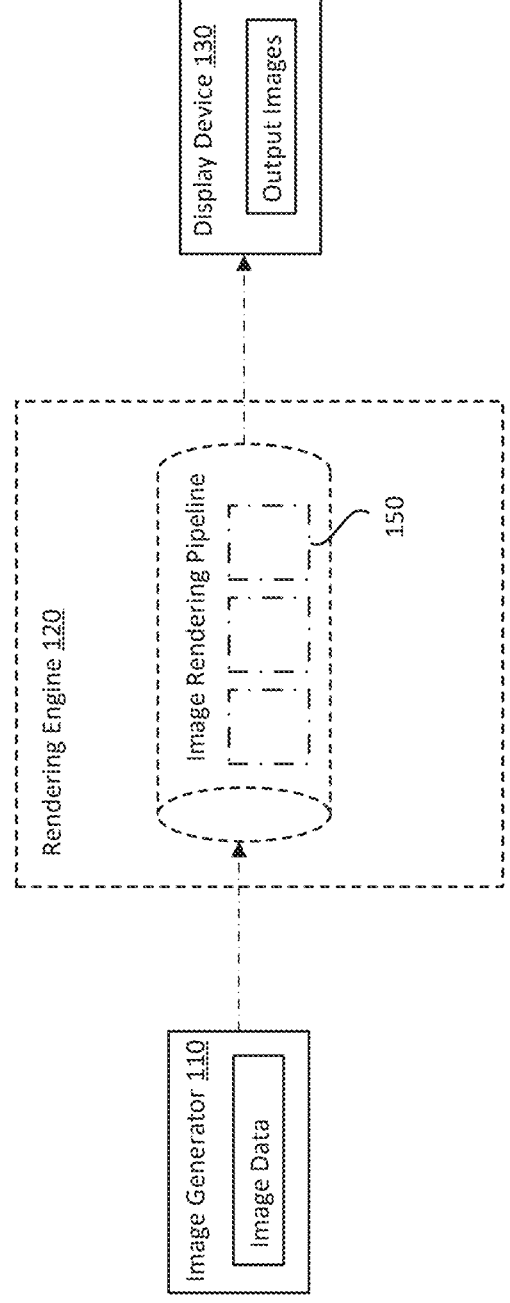
FIG. 1 illustrates an example of an image processing flow.

Attention is now directed to FIG. 1. As shown, an image processing flow 100 includes an image generator 110 processing image data that is fed through an image rendering pipeline of a rendering engine 120 for preparing output images configured for rendering on a display device 130 with a desired format and at a desired resolution.

The image data may comprise actual images that are created by the image generators. In some instances, for example, the image generator is a gaming engine that executes a game simulation or other application execution that generates image data structures that define attributes and properties of the images to be generated. Additionally, or alternatively, the image generators can generate visualizations of the image data that are rendered on a connected display device. In this alternative scenario, the images may be handled, post-generation, by the image generator.

The rendering engine 120 may be a stand-alone software module that utilizes hardware, such as a graphics processing unit (GPU) or other hardware components. The rendering engine 120 may be integrated into the image generator (e.g., gaming engine) and/or display device and/or an intermediary system interposed between the image generator and end-user display device. This disclosure will broadly use the term image generator to refer to a gaming engine, rendering engine, or any other application that is configured to generate images.

The processes performed by the rendering engine 120 may include various discrete processes for altering the attributes of the images being processed. By way of example, the image rendering pipeline of the rendering engine 120 may include image processing such as, but not limited to, processing that modifies or applies a particular style, format, orientation, coloring, contrast, brightness, filtering, masking and/or other imaging transformation to the images being processed.

One of the imaging processes that may be performed by the rendering engine 120 is super-resolution processing performed by a super-resolution machine learning model (e.g., super-resolution model 150). Super-resolution processing may include upscaling a low-resolution image into a high-resolution image. Super-resolution processing may also include other related processes, such as anti-aliasing.

An additional process that may be performed by the rendering engine 120 as part of the image rendering process, to facilitate the super-resolution processing performed by the super-resolution model 150 includes tiling. The tiling may also be performed during pre and post processing operations, separate from the super-resolution image processing performed by the rendering engine. An image, for example, may be too large to be handled simultaneously or as a single job by the super-resolution model 150, since each layer in the super-resolution model 150 may perform extensive computations and convolutions when transforming the input images into the output images. The computations and convolutions include the application of functions to generate output images that are a function or derivation of the input image. These convolutional operations are typically performed on a per-pixel basis (e.g., each output pixel of the output image is a function or kernel of the corresponding input pixel of the input image, as well as the nearby neighboring pixels to the input pixel of the input image). Because the output image pixels are each computed based on a large volume of underlying input pixel data, the processing of the output pixels for an entire image at one time can represent a significant burden. Additionally, the outputs generated at each layer of the super-resolution model must be retained in memory to be fed into the next layer of the super-resolution model 150. This problem is also amplified because the image dimensions will usually be much larger than the computational shape of the inference hardware (NPU MAC arrays, GPU SIMDs compute units, etc.) This also represents a burden on memory handling and can cause bottlenecking that further slows the performance of the convolutional operations.

To help address this problem, as previously noted, a system may perform tiling of an image, by splitting the image into separate tiles that can be processed in serial and that, even if processed in parallel, can be performed more efficiently by reducing the bottlenecking caused by transferring large batches of data between memory at any given instance. The tiling of the image may be done by the rendering engine and, in some embodiments, by the super-resolution model 150.

Figure 2:
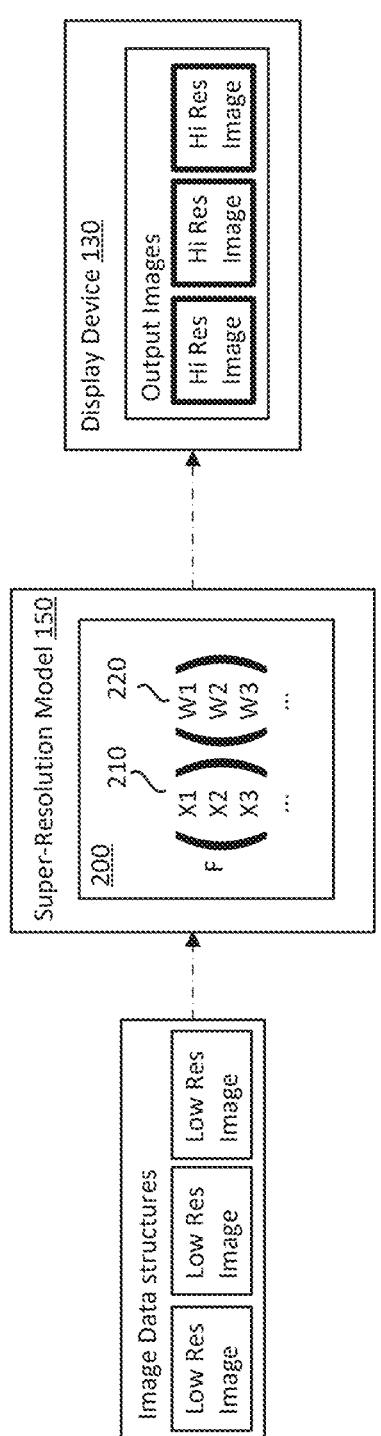
FIG. 2 illustrates an example of a super-resolution processing flow associated with a machine learning model performing super-resolution on low-resolution images to generate corresponding high-resolution images.

FIG. 2 illustrates one example of a super-resolution processing flow in which image data structures, such as low-resolution images are upscaled into output images comprising high-resolution images, based on the low-resolution images, and which are prepared for rendering on a display device 130.

As shown, the upscaling is performed by a super-resolution model 150 that comprises one or more algorithms 200 that are used to transform input images through one or more convolutions into output images. The super-resolution model 150 does this by converting parameters 210 of the image (e.g., pixel values) of the low-resolution images into input tensors defining pixels in a region of an image that are processed by convolutions of the super-resolution model 150 to generate output pixels for an output tensor region of an output image. The super-resolution model applies weights to the various pixel input values (e.g., parameters 210) to control how much influence each of the input pixel parameters 210 will have on the output pixel values. During the training of the super-resolution model, the weights can be modified, based on one or more loss function of the super-resolution model, to adjust for differences between an actual output from the super-resolution model 150 and an expected output. Some examples of loss functions that can be used include the pixel-wise loss function and perceptual loss function.

During training, the super-resolution model 150 is applied to the training data. The training data comprises correlating pairings of low-resolution images and high-resolution images. Then, the low-resolution image properties or attributes are used as inputs for model parameters 210. The weights 220 used by algorithms of the model are then adjusted to account for error values that are detected between the final model output 330, such as the differences between the high-resolution output image and the corresponding high-resolution image 324 from the training data image pairing.

The weights 220 will continue to be modified as the model is applied to different training data, thereby causing the model to proceed along a gradient descent to a desired threshold of convergence in the similarity between the output generated by the model (e.g., high-resolution output image) compared to a desired target output (e.g., output represented by high-resolution image in the training data).

The super-resolution model 150 can be trained to perform super-resolution processing on different types of images and at different resolutions to accommodate different needs and preferences.

As previously noted, in some instances, it can be more efficient to split an image into numerous separate tiles that are each processed separately by the super-resolution model. Then, after being upscaled by the super-resolution model, they can be stitched together to form final output images. Techniques for splitting an image and stitching an image back together are known to those of skill in the art and there are various modules that exist in conventional rendering engines and super-resolution models for performing tiling and stitching processes.

Figure 3:
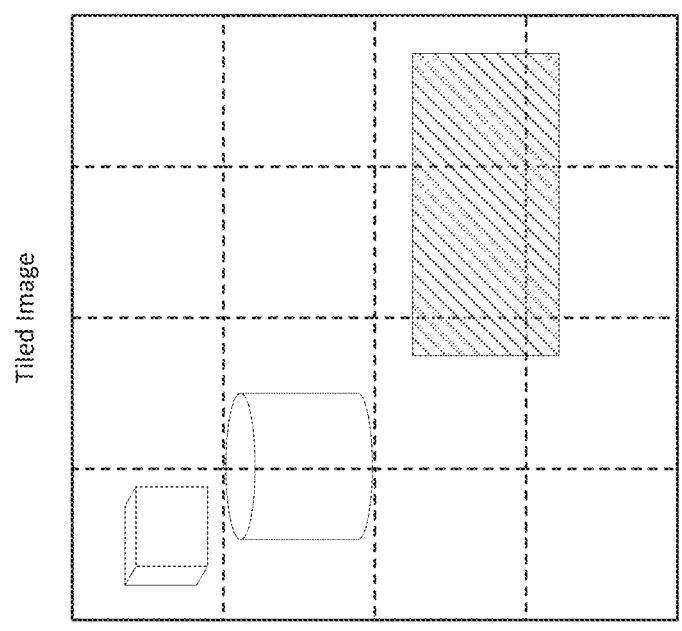
FIG. 3 illustrates an example of an image being divided into a tiled image having discrete input tiles that can each undergo super-resolution processing.
Figure 3:
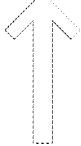
Figure 3:
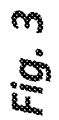
Figure 3:
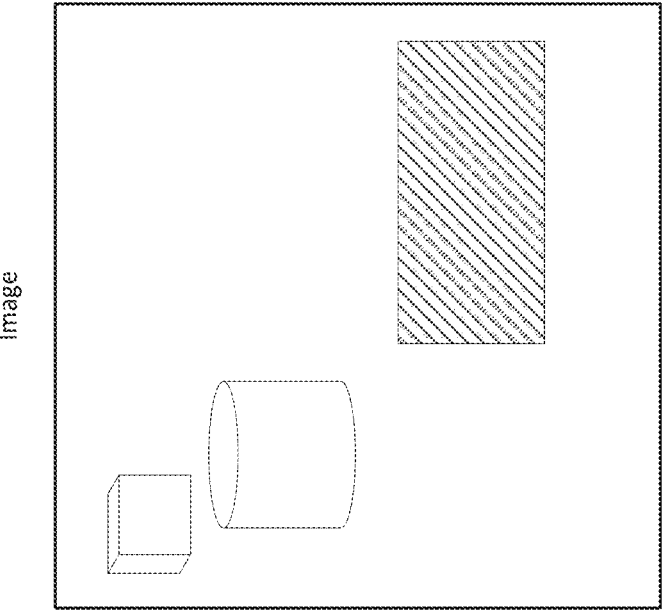

FIG. 3 illustrates one example of an image that is divided into sixteen separate tiles. Notwithstanding the current example, it will be appreciated that an image can be split into tiles of different sizes to accommodate different needs and preferences (e.g., splitting an image into four tiles, thirty two tiles, sixty four tiles, or any other number of tiles, even a number of tiles that is not a factor of four). The tiles can also be uniform in shape and size, as shown, or have varying shapes and sizes. For a given image and the inference processing of it, the input tiles will be uniform in shape and size. During tiling, the border tiles may extend beyond the image dimensions. In such instances, the tiles will be padded (e.g., populating pixels values for pixels in the border tiles that extend beyond the image dimensions with null or zero values) before being sent to the model for super-resolution processing.

Figure 4:
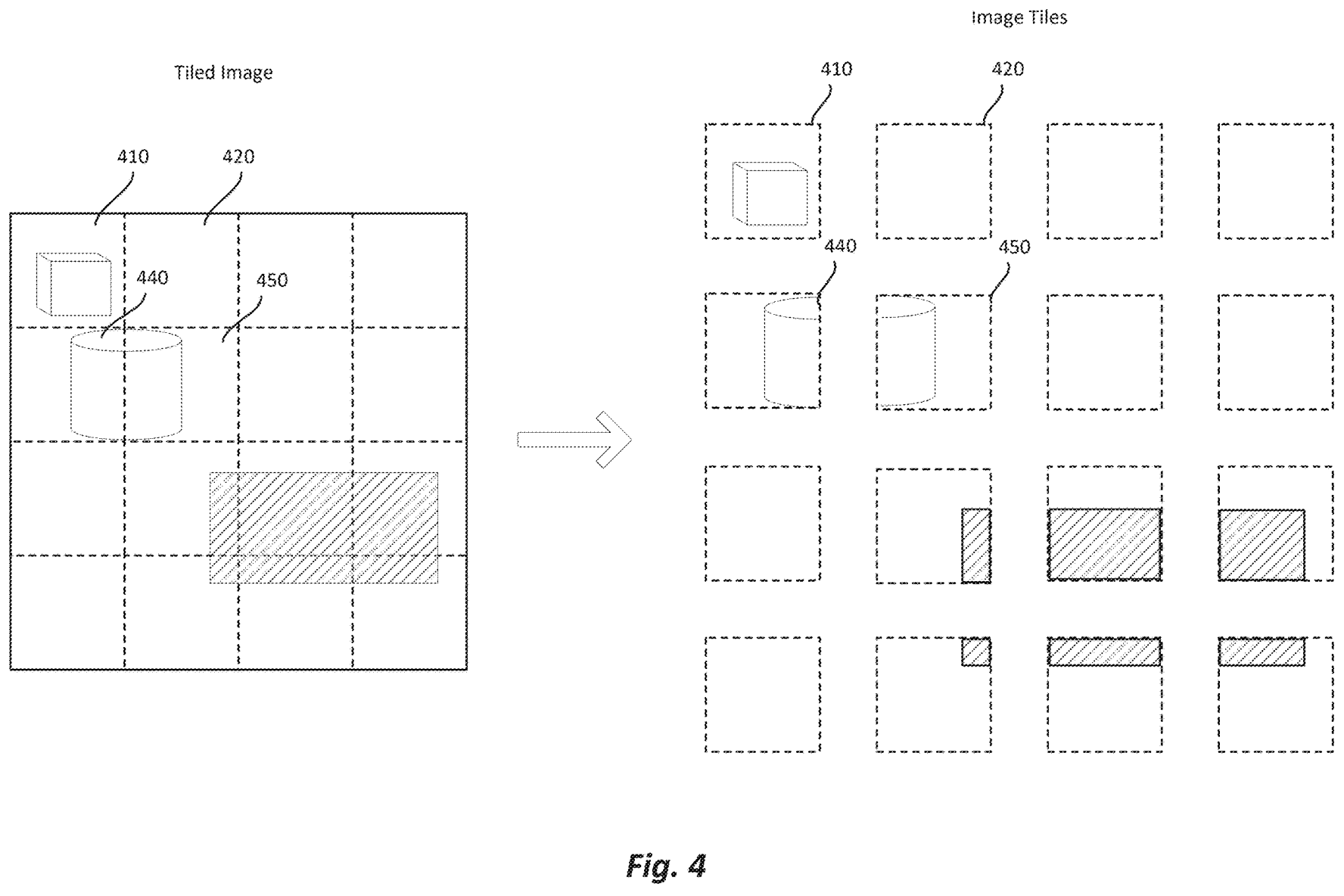

The tiles of an image, once identified, can be separated for independent processing, as shown in FIG. 4. In particular, tile 410 (which includes a visualization of a cube) and tile 450 (which includes a visualization of a half cylinder) can be processed separately by the super-resolution model. In particular, the upscaling of tile 410 can be performed separately from the upscaling of tile 450, even when the upscaling processes are performed in parallel.

Notably, by splitting the image into discrete tiles, each of the discrete tiles will now include artificial edges where they were previously conjoined to adjacent tiles. When conjoined, the convolutional operations performed by the super-resolution model on a pixel-by-pixel basis will utilize all of the original neighboring pixels within a predefined receptive field for each pixel being processed. For example, in a 3×3 convolutional operation, a set of nine input pixels (in a symmetric pattern of three rows and three columns) can be transformed into a single output pixel based on the pixel properties of the nine input pixels. The super-resolution model may weigh the pixel properties of the different pixels differently, depending on where they are located, such that the properties of the center-most pixel may be given more weight in the convolutional operations than the outer-most pixels. For a 5×5 convolutional operation, a set of twenty-five pixels may be utilized when determining the properties of a single output pixel, and so forth.

Additionally, during the convolutional operations, when generating an output pixel the super-resolution model may utilize the properties of each of the primary neighboring pixels that include or adjoin the corresponding and under-lying input pixel(s) in the input image, as well as the properties of each of the more further remote secondary pixels that adjoin or that are within a neighboring proximity to the primary neighboring pixels, and so forth. The super-resolution model 150 is trained to apply different weights to the different pixel properties, usually with decrementing importance placed on the properties of pixels that are more spatially remote from the output pixels being generated. In alternative embodiments, the importance of all pixels may remain the same or be modified according to different weighting schemes.

Figure 5:
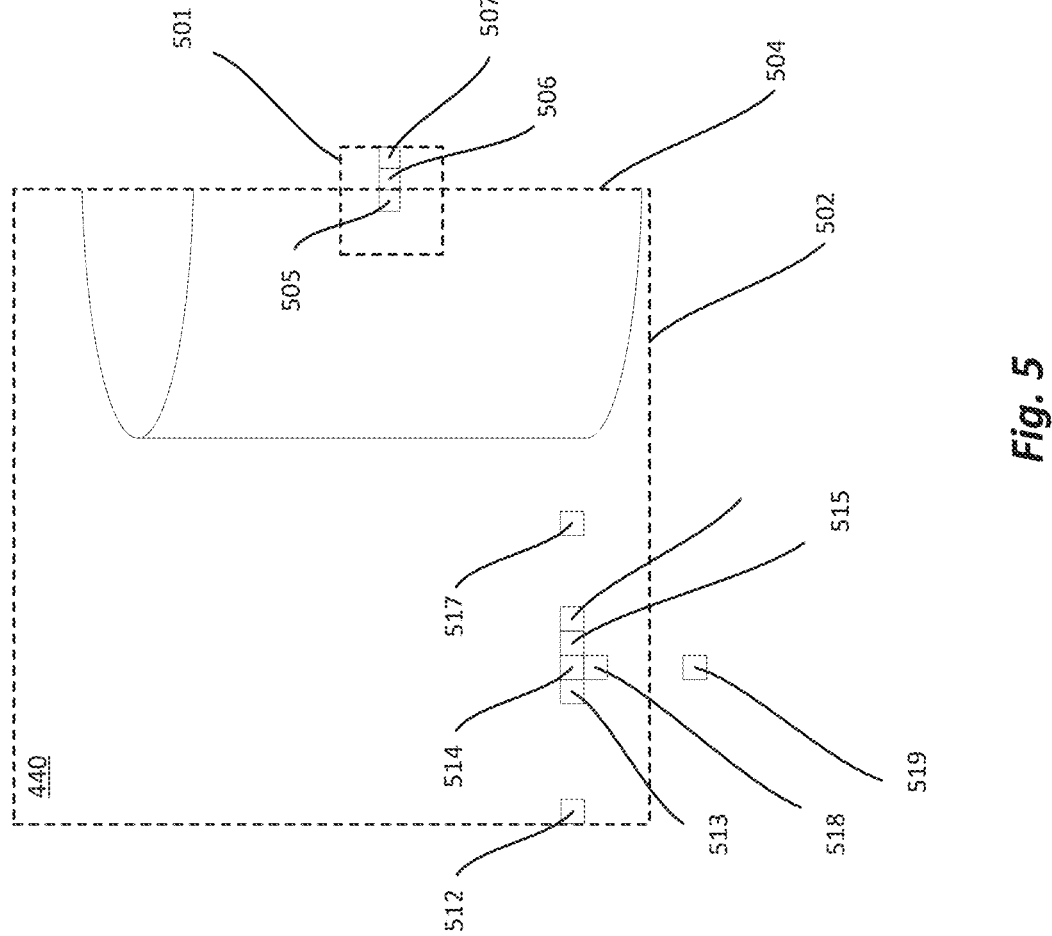
FIG. 5 illustrates an example of an image tile and pixels within the image tile, as well as a receptive field for performing super-resolution processing with the pixels.

To illustrate this point, an example will now be provided in FIG. 5 with reference to tile 440 of FIG. 4. Notably, during the convolutional operations performed by the super-resolution model, the generation of an output pixel corresponding to the underlying input pixel 514 will include the pixel properties of pixel 514 as well as properties of neigh-boring pixels based on indirect chaining through the convolutions performed on the different pixels. For instance, during a convolution, the input tensor for pixel 514 will include the neighboring spatial tensor elements (e.g., pixel values for immediate neighbors 513 and 515). However, each of those neighboring elements were created by a prior convolution which includes other inputs based on even further removed neighbors at a greater distance from pixel 514 (e.g., pixel 516), and so forth, such that inputs to the convolution for pixel 514 may indirectly include values based on pixels that are very far removed from pixel 514 (e.g., pixel 517 and which were incorporated into prior convolutions through a chain of neighboring pixels. s The range of the pixels that are utilized in any direction from the pixel being processed will be based on the receptive field size that is established for processing the pixels (e.g., a 5×5 receptive field with 2 pixels in each direction of the underlying pixel being processed). It will be appreciated that the size of the receptive field of view may vary to accommodate different needs and preferences and is defined through the configuration of the super-resolution model. It will also be appreciated that all of the pixels contained within the receptive field of the pixel being processed can be considered neighboring pixels (primary or secondary neighbors). The properties of these neighboring pixels will be used when generating the output pixels for the underlying pixels being processed, as discussed.

Unfortunately, when tiling an image into discrete tiles for processing the receptive field extends beyond the edges of the tile, including artificial edges (e.g., edges 502, 504) that are created during the tiling. For instance, if the field of view 501 for processing pixels in tile 440 were set to a 5×5 field of view, as shown, then during processing of pixel 505, the super-resolution model would not utilize properties of pixels 506 and 507, even though they are neighboring the under-lying pixel 505 that is being processed. This can cause the aforementioned degradation in the generation of the output pixels corresponding to the underlying pixels (e.g., pixel 505) being processed with a receptive field (e.g., receptive field 501) that omits neighboring pixels (e.g., pixels 506 and 507) relative to the output pixels generated for the under-lying input pixels (e.g., pixel 514) that have a full receptive field of neighboring pixels (e.g., pixels 513, 514, 516, 518, and other neighboring pixels not explicitly referenced but that are within a distance of two pixels from the 514 pixel being processed). This degradation is worsened for process-ing of pixels that are nearest the edges (e.g., 502 and 504), as these edges are now omitting neighboring pixels that are present in the original image and the adjacent image tiles (e.g., tile 450 of FIG. 4), but that are no longer utilized as a result of the super-resolution model processing each tile separately.

During the super-resolution processing, the super-resolution model applies padding of omitted pixel data in replacement of missing neighboring pixel data for pixels that correspond to pixels within a receptive field for pixels being processed but that extend beyond the tile boundaries. The padding may include adding pixel data based on neighboring pixels that have existing pixel data (e.g., pixel data for pixels remaining within the tile boundaries). Application of padding introduces degradation, as the processed replacement/null pixel data is different than the original pixel data for the neighboring pixels that are omitted from the receptive field for pixels on the tile edges.

To further help compensate for this degradation and to minimize the visibility of the seams caused by this degradation when stitching the output images back together, the current embodiments provide for dynamically selecting a halo region that borders the outer edges of the tiles and that includes input pixel data to be used during the convolution operations. The output pixel data generated for pixels within the halo may be discarded before stitching the output tiles back together along the defined edges of the tiles without the halo. This means that the halo will overlap pixels that are contained within the adjacent tile.

The use of the halo region during processing can result a reduction in visible seams and other discontinuities that are present when the degradation of the convolution operations is more pronounced without processing the additional pixel outputs for the halo region around the tiles.

Figure 6:
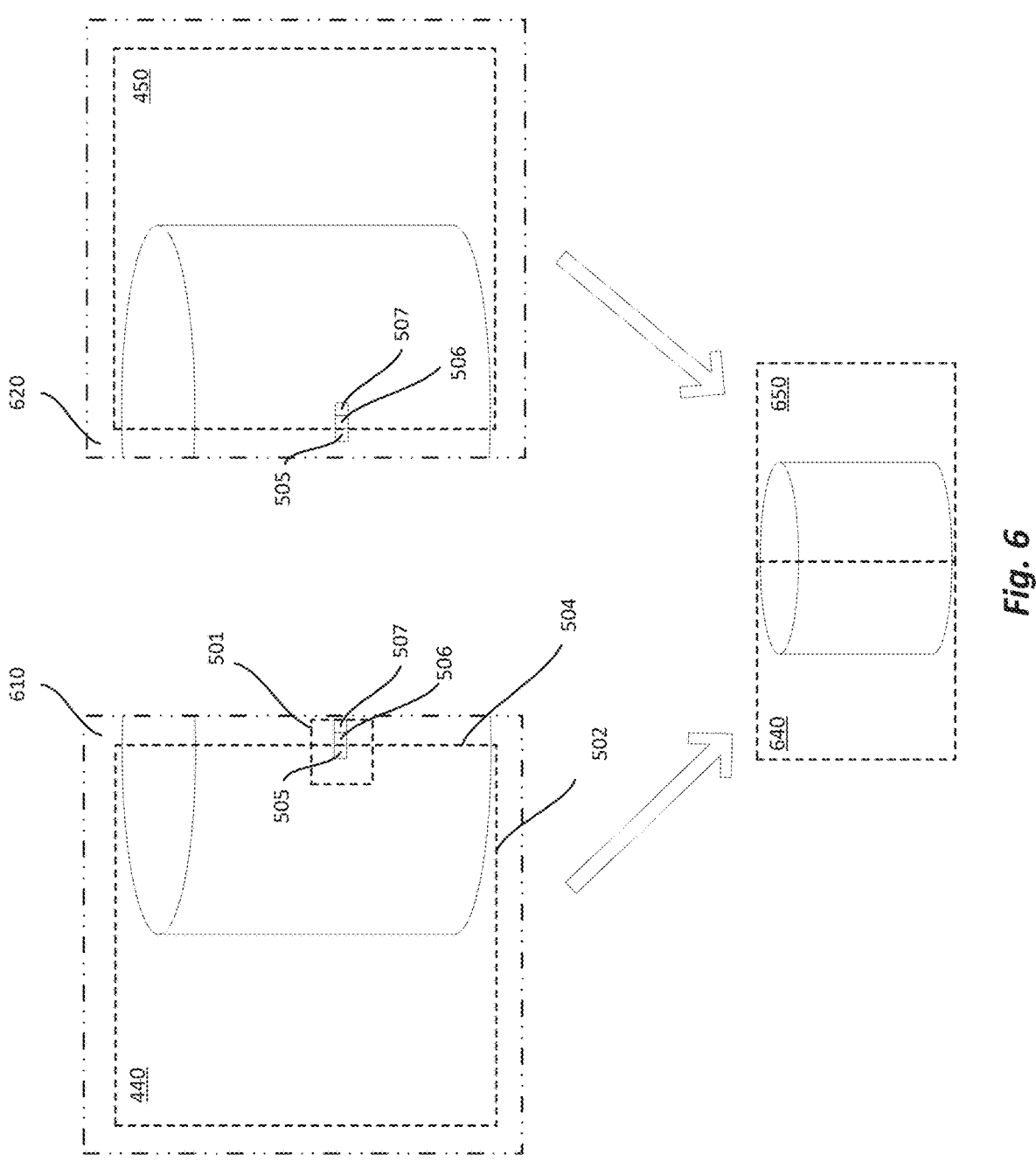
FIG. 6 illustrates input tiles having halo regions that are processed by a super-resolution model to generate output tiles that are stitched together to form an output image.

To illustrate this point, reference is now directed to FIG. 6 relative to previous discussions of FIGS. 4-5. As shown, halo region 610 around tile 440 encompasses pixels (e.g., pixels 506 and 507). While these pixels (506, 507) are within the tile boundaries of tile 450, and outside of the tile boundaries of tile 440 (i.e., outside of edges 502, 504), they will still be processed by the super-resolution model during processing of tile 440. In this regard, the size of the tile 440 is increased to include the halo region 610 for inference. In particular, the spatial input tensor region of the tile used during the convolutional processing of the super-resolution model will include the halo region 610 but will be discarded when forming the tensor output region of the output tile that is stitched together with other output tiles.

As noted earlier, the term halo in the context of a convolution is the spatial input tensor region that extends beyond the output tensor region when a kernel size greater than one is used. For example, a convolution with a 5×5 kernel will have a 2-pixel halo around the input tensor region (2 columns on each side and 2 rows above and below). The halo may either be read from the input tensor directly (producing an output that is smaller than the input), or it may be filled with padding (to preserve original tensor shape).

Notably, the output pixel data generated for pixels inside of the halo region 610 (e.g., pixels 506 and 507) will be processed redundantly, including during the processing of tile 440 as well as during the processing of any other tile containing those pixels (e.g., tile 450 that also contains pixels 506 and 507). However, upon completion of the super-resolution processing of tile 440, the output pixel data for pixels contained within halo region 610 will be discarded, whereas this output pixel data will be retained for tiles that contain the pixels that fall within the non-halo region (e.g., for tile 450).

By including the pixels within halo region 610 for the underlying input tile 610 during processing, it is possible to minimize the degradation for the underlying edge pixels of the tile (e.g., pixel 505) that are processed. In particular, pixel 505 will have a receptive field that is populated with more valid input image data of neighboring pixels since the receptive field extent may be larger than the halo extent. This additional input image data obtained from the halo extent is applied during the convolutional operations, which would not be possible if pixels in the halo region 610 were not included with the tile. Likewise, by using halo region 620 of 450, it is possible to provide a full receptive field of neighboring pixels to be utilized when processing pixel 506 during super-resolution processing of tile 450. Then, after discarding any processed output pixel data for pixels contained within the halo region 610 and halo region 620, the remaining output tiles (640, 650) can then be stitched together along their edges omitting the halo regions (610, 620).

By increasing the size of the halo region, which results in a larger overall input tile size, a larger portion of pixels from adjacent tiles will be overlapped and redundantly processed during the super-resolution processing. However, this increased processing load may be offset by a reduction in the seam between the edges of the adjacent output tiles when they are stitched together. To balance the amount of redundant processing relative to a desired output, the system may utilize degradation thresholds when selecting the size of the input tiles and halo regions that overlap adjacent tiles.

The degradation thresholds can be predetermined and set for a system and/or may be based on user input entered for a rendering engine or super-resolution processing model, such as during model development and/or when evaluating runtime capabilities. The cropped size of the final written tiles and the halo regions can then be adjusted to ensure that the degradation caused by the convolutional operations of the super-resolution model are within the predetermined degradation thresholds.

In some embodiments, the system may automatically adjust the size of the halo region and tiles based on the degradation that is detected by the system, relative to the predefined degradation thresholds.

In some embodiments, the general degradation is determined through a relative comparison of the loss calculated for a model output for an entire non-tiled image (using full image ground truth as the reference in the function) vs. the loss calculated for model outputs in a tiled and stitched together image (also using the full image ground truth as the reference).

It is also possible to assess the relative degradation of pixels across the border regions of a tile (without access to the full receptive field), through a statistical analysis using a large number of frames/tiles (e.g., 50, 100, 1000, or more than 1000). This approach also uses the general degradation methodology but tracks relative loss on a per-pixel basis and then aggregates results based on relative tile locations (i.e. distance from the tile edges).

When the degradation automatically detected by the system exceeds a predetermined degradation threshold set for the system or target outputs (regardless of how that threshold is set), the system will automatically adjust the dimensional size and halo region of new tiles split from new input images until the super-resolution model performs the super-resolution processing within the desired degradation threshold(s). The adjustment can be performed based on predetermined rules applied by the model (e.g., rules to scale a tile size and/or halo region size larger or smaller by 1%, 2%, 5%, 10%) and until the super-resolutiomodel is performing the super-resolution processing within the desired degradation threshold(s).

While the degradation effects can be reduced by increasing the size of the halo region, some degradation may still occur due to the convolutional operations and extensive dependent processing of neighboring pixels, including some remotely dependent neighboring pixels that may be omitted from a halo region (even when enlarged). In these instances, during the during the super-resolution processing, the super-resolution model will apply padding of omitted pixel data in replacement of missing neighboring pixel data for pixels that are omitted from a receptive field for pixels being processed within the halo region during the convolution operations, as previously noted.

This padding may be zero padding in which null values are provided in replacement of missing neighboring pixel data for pixels that are omitted from a receptive field. Additionally, or alternatively, replication padding may be used by duplicating values of pixels existing within the receptive field in replacement of missing neighboring pixel data for pixels that are omitted from a receptive field. Other padding modes can also be used, such as reflect (or mirror) padding and circular (or wrap) padding, which are known to those of skill in the art.

While the foregoing examples describe how a halo region can be enlarged to provide reduced degradation (e.g., by including more pixel values to compensate for omitted pixels within the field of view but beyond the tile edges), it will also be appreciated that the halo region can also be reduced in size to reduce the memory bandwidth and processing requirements for performing the super-resolution processing. This option is particularly beneficial for situations in which users do not care about the seams between the output tiles in the output image due to the seams being relatively imperceivable on certain output display devices.

This can also be a viable option for enabling the continued use of existing super-resolution models that may subsequently be augmented with post-processing modules capable of smoothing the seams to be even less perceptible and which may require less computational cost that would be required to increase the size of the halo regions for the input tiles. By enabling the modification to the halo regions, it is possible to extend the life of super-resolution models that might otherwise be deprecated (if they are hard-coded to only use a single halo size for image tiles) given new post-processing techniques that might be developed and incorporated into the super-resolution image processing.

Attention is now directed to FIG. 7, which illustrates a flow diagram 700 of a plurality of acts associated with methods for performing dynamic tiling of images and for performing super-resolution processing of the tiles split from input images to generate corresponding output images at higher resolutions that the resolutions of the input images.

The illustrated acts are implemented by a computing system having a processor and storage that stores computer-executable instructions that are executable by the processor to implement the functionality of the referenced acts.

The first illustrated act includes a computing system obtaining input images for super-resolution processing (act 710). This may include for instance, the computing system incorporating or communicating with a gaming engine that generates images to be upscaled or otherwise modified during super-resolution processing. This may also include receiving or accessing images from a third-party source.

Next, the computing system obtains a super-resolution model trained to transform the input images from a first resolution into corresponding output images of a second resolution that is higher than the first resolution (act 720). This may include accessing a super-resolution model that is instantiated on the computing system or a connected rendering engine, such as a gaming engine. This may also include accessing a super-resolution model from a virtual machine or service provided by a remotely connected server system. This may also include generating the super-resolution model.

Next, the computing system splits the input images into a plurality of input tiles having a tile size and a halo region that defines an overlap of adjacent input tiles (act 730). As noted above, the halo region borders the outer edge of a tile and includes input pixel data to be used during the convolution operations for the pixels of that tile. Any output pixel data generated for pixels within the halo may be discarded before stitching the output tiles back together along the defined edges of the tiles without the halo. This means that the halo will overlap pixels that are contained within the adjacent tile and that will be processed when generating an output for the adjacent tile.

Notably, as previously described, the tile size and the halo region may be dynamically selected based on a degradation and/or degradation threshold associated with convolution operations of the super-resolution model. In some alternative embodiments, the tile size and halo region are selected based on user input defining a degradation threshold and/or perceived degradation associated with the super-resolution processing.

In other instances, the computing system automatically detects the degradation that is occurring and automatically selects and/or modifies the tile size and halo region of tiles that are split from input images (e.g., modifying the processing for the initial input images and/or modifying the processing for new and different input images) processed by the same super-resolution model to cause the degradation resulting from the convolution operations of the super-resolution model to be within defined degradation thresholds. This may include increasing or decreasing the size of the halo region and corresponding overall tile size of the input tiles.

Next, the computing system applies the super-resolution model to the plurality of input tiles of the first resolution to generate the corresponding output tiles of the second resolution (act 740). This may include causing the super-resolution model to be applied to the input tiles by a third-party system or a separate computing device containing the super-resolution model during the super-resolution processing.

During the super-resolution processing, the super-resolution model applies padding to convolution operations to cause neighboring pixels to be omitted from the input of pixels being processed. The padding may be zero padding in which null values are provided in replacement of pixels that are within the receptive field that extends beyond the edges of the tile. Additionally, or alternatively, replication padding may be used by duplicating values of pixels existing within the receptive field that extend beyond the edges of the tile within the halo region.

Finally, the computing system stitches the output tiles into output images (act 750). This will include, as previously described, the discarding of output pixel data for pixels that are contained within the halo region of each input tile that is processed for generating the corresponding output tile. This also includes aligning the edges of output tiles that correspond to the edges of adjacent output tiles. This may also include saving and/or rendering a single output image containing all of the output tiles generated from the input tiles corresponding to a single input image within the output image.

In some instances, the disclosed methods may also include identifying new input images and modifying the halo region and tile size for new input tiles that are split out of the new input images to accommodate different needs and preferences based on the aforementioned degradation thresholds and any detected degradation caused by the convolutional operations of the super-resolution model when processing the input tiles of the new input images.

The selection of the size of the tiles and halo regions for the initial images, as well as for the new images is based on degradation thresholds associated with the super-resolution model and corresponding to degradation determined through a relative comparison of the loss calculated for a model output for an entire non-tiled image (using the full image ground truth as the reference in the function) vs. the loss calculated for model outputs in a tiled and stitched together image (also using the full image ground truth as the reference).

It will be appreciated that the disclosed techniques can help overcome many of the foregoing problems associated with facilitating super-resolution processing in a manner that can help overcome many of the foregoing problems associated with super-resolution processing. In particular, by providing embodiments for dynamically adjusting the size and halo region of the tiles that are split from the images being processed, it is possible to help control the scale of visible seaming that can occur as a result of the convolutional operations performed on discrete tiles of the images performed during super-resolution processing.

These embodiments also facilitate using a single super-resolution model to process tiles of different sizes having differently sized halo regions to accommodate different preferences and for dynamically switching the sizes of the tiles and halo regions of the tiles split from images processed by the super-resolution model.

It will also be appreciated that the disclosed methods may be practiced by a computer system comprising a computer including one or more processors and computer-readable media such as computer memory. In particular, the computer memory may store computer-executable instructions that when executed by one or more processors cause various functions to be performed, such as the acts recited in the embodiments.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes RAM (random access memory), ROM (read-only memory), EEPROM (programmable read-only memory), CD-ROM (compact disk read-only memory), or other optical disk storage (such as CDs (compact disks), DVDs (digital video disks), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, as described herein, the computer properly views the connection as a transmission medium. Transmission media can include a network and/or data links that can be used to carry or desired program code means in the form of computer-executable instructions or data structures, and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"—network interface card), and then eventually transferred to computer system RAM and/or less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

15                                            16

What is claimed is:

1. A method for dynamically controlling tiling to facilitate super-resolution processing and rendering of upscaled images, the method comprising:

obtaining input images for super-resolution processing;

obtaining a super-resolution model trained to transform the input images from a first resolution into corresponding output images of a second resolution that is higher than the first resolution;

splitting the input images into a plurality of input tiles of the first resolution having a tile size and a halo region that defines an overlap of adjacent input tiles, the tile size and the halo region being selected based on a degradation threshold associated with the super-resolution model;

applying the super-resolution model to the plurality of input tiles of the first resolution by inputting the plurality of input tiles to the super-resolution model to generate corresponding output tiles of the second resolution; and stitching the output tiles into output images.

2. The method of claim 1, wherein the method further includes automatically selecting the tile size and the halo region in response to identifying a degradation associated with the super-resolution model performing convolution operations on pixels within the plurality of input tiles.

3. The method of claim 2, wherein the method further includes automatically identifying the degradation associated with the super-resolution model based on a relative comparison of a loss calculated for model output generated for an entire non-tiled image relative to a loss calculated for model outputs in a tiled and stitched together image.

4. The method of claim 2, wherein the method further includes automatically identifying the degradation associated with the super-resolution based on a loss function of the super-resolution model.

5. The method of claim 1, wherein the method further includes modifying the tile size in response to identifying a degradation associated with the super-resolution model performing convolution operations on pixels within the plurality of input tiles.

6. The method of claim 1, wherein the super-resolution model applies padding comprising a zero padding in which null values are provided in replacement of missing neighboring pixel data.

7. The method of claim 1, wherein the super-resolution model applies padding comprising replication padding in which duplicated values are provided in replacement of missing neighboring pixel data.

8. The method of claim 1, the plurality of input tiles comprising a first plurality of input tiles, wherein the method further includes:

applying the super-resolution model to a second plurality of input tiles to generate new output tiles, the second plurality of input tiles having a tile size and a halo region that is larger than a selected tile size and halo region of the first plurality of input tiles.

9. The method of claim 7, the method further comprising:

selecting the tile size and halo region for the second plurality of input tiles based on degradation thresholds and a degradation associated with convolution operations performed by the super-resolution model when processing the second plurality of input tiles.

10. A computing system comprising:

one or more hardware processors; and one or more storage devices storing executable instructions that are executable by the one or more hardware processors for causing the computing system to implement a method that includes the computing system:

obtaining input images for super-resolution processing;

obtaining a super-resolution model trained to transform the input images from a first resolution into corresponding output images of a second resolution that is higher than the first resolution;

splitting the input images into a plurality of input tiles of the first resolution having a tile size and a halo region that defines an overlap of adjacent input tiles, the tile size and the halo region being selected based on a degradation threshold and a degradation associated with the super-resolution model;

applying the super-resolution model to the plurality of input tiles of the first resolution by inputting the plurality of input tiles to the super-resolution model to generate corresponding output tiles of the second resolution; and stitching the output tiles into output images.

11. The computing system of claim 10, wherein the method further includes automatically selecting the tile size and the halo region in response to identifying a degradation associated with the super-resolution model performing convolution operations on pixels within the input tiles.

12. The computing system of claim 11, wherein the method further includes automatically identifying the degradation associated with the super-resolution model performing convolution operations on pixels within the input tiles based on a relative comparison of a loss calculated for model output generated for an entire non-tiled image relative to a loss calculated for model outputs in a tiled and stitched together image.

13. The computing system of claim 11, wherein the method further includes automatically identifying the degradation associated with the super-resolution model performing convolution operations.

14. The computing system of claim 10, wherein the method further includes modifying the tile size in response to identifying a degradation associated with the super-resolution model performing convolution operations on pixels within the plurality of input tiles.

15. The computing system of claim 10, wherein the super-resolution model utilizes padding for omitted pixel data, the padding comprising zero padding in which the omitted pixel data is replaced with null pixel property values.

16. The computing system of claim 10, wherein the super-resolution model utilizes padding for omitted pixel data, the padding comprising replication padding in which duplicated pixel property values are provided in replacement of pixel property values for the omitted pixel data.

17. The computing system of claim 10, the plurality of input tiles comprising a first plurality of input tiles, wherein the method further includes:

applying the super-resolution model to a second plurality of input tiles to generate new output tiles, the second plurality of input tiles having a tile size and a halo region that is larger than a selected tile size and halo region of the first plurality of input tiles.

18. The computing system of claim 17, the method further comprising: selecting the tile size and halo region for the second plurality of input tiles based on a degradation associated with convolution operations performed by the super-resolution model.

*    *    *    *    *